US012098726B2

(12) United States Patent
Fang

(10) Patent No.: US 12,098,726 B2
(45) Date of Patent: Sep. 24, 2024

(54) FAN

(71) Applicant: Delta Electronics, Inc., Taoyuan (TW)

(72) Inventor: Yu-Hsiang Fang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 350 days.

(21) Appl. No.: 16/908,163

(22) Filed: Jun. 22, 2020

(65) Prior Publication Data

US 2021/0140440 A1 May 13, 2021

Related U.S. Application Data

(60) Provisional application No. 62/932,636, filed on Nov. 8, 2019.

(51) Int. Cl.

| | |
|---|---|
| ***F04D 25/06*** | (2006.01) |
| ***F04D 19/00*** | (2006.01) |
| ***F04D 25/08*** | (2006.01) |
| ***H02K 5/10*** | (2006.01) |
| ***H02K 7/08*** | (2006.01) |
| ***H02K 7/14*** | (2006.01) |

(Continued)

(52) U.S. Cl.

CPC ....... *F04D 25/0693* (2013.01); *F04D 19/002* (2013.01); *F04D 25/0613* (2013.01); *F04D 25/082* (2013.01); *H02K 5/10* (2013.01); *H02K 7/085* (2013.01); *H02K 7/14* (2013.01); *H02K 11/33* (2016.01); *H02K 21/22* (2013.01); *H02K 2211/03* (2013.01)

(58) Field of Classification Search

CPC .. F04D 19/002; F04D 25/0613; F04D 25/082; H02K 1/187; H02K 5/08; H02K 5/10; H02K 7/085; H02K 2211/03

See application file for complete search history.

(56) References Cited

U.S. PATENT DOCUMENTS 5,264,748 A * 11/1993 Ootsuka .................. F16C 17/04 310/90

6,359,354 B1 * 3/2002 Watanabe ........... F04D 25/0693 310/43

(Continued)

FOREIGN PATENT DOCUMENTS

CN 202118000 U 1/2012
CN 102337052 A 2/2012

(Continued)

*Primary Examiner* — Devon C Kramer
*Assistant Examiner* — Joseph S. Herrmann
(74) *Attorney, Agent, or Firm* — KIRTON McCONKIE; Evan R. Witt

(57) ABSTRACT

A fan comprises a fan frame, a motor, an impeller, a circuit board and an enclosing layer. The fan frame has a motor base disposed in a central portion thereof. The motor is mounted on the motor base and has a rotor, a stator and a bearing unit. The stator is disposed around the outer periphery of the bearing unit, and the rotor is sheathed on the stator and the bearing unit. The impeller is mounted on the motor. The circuit board is sheathed on the bearing unit and located between the stator and the motor base, and has a plurality of electronic components disposed on a first surface thereof. The stator and the circuit board are enclosed by the enclosing layer, and the plurality of electronic components are enclosed by the uniform enclosing layer with a specific thickness.

11 Claims, 8 Drawing Sheets

(51) Int. Cl.
*H02K 11/33* (2016.01)
*H02K 21/22* (2006.01)

(56) References Cited

U.S. PATENT DOCUMENTS 6,713,907 B2 * 3/2004 Matsumoto ............ H02K 1/187 310/90
6,828,706 B2 * 12/2004 Kudo .................. F04D 25/0646 310/43
7,635,934 B2 * 12/2009 Zhu ........................ H02K 1/187 310/88
8,629,584 B2 * 1/2014 Smirnov ................ H02K 7/085 310/90
8,967,867 B2 3/2015 Kimura et al.
10,110,085 B2 10/2018 Lin et al.
2006/0145567 A1 * 7/2006 Lee .......................... H02K 5/10 417/373
2011/0074230 A1 * 3/2011 Hasegawa .............. H02K 5/163 310/43
2013/0119801 A1 * 5/2013 Smirnov ............... F16C 33/763 310/90
2014/0169969 A1 * 6/2014 Takakuwa ............. F04D 25/068 416/170 R
2018/0198351 A1 * 7/2018 Akutsu .................. H02K 7/003
2018/0278116 A1 * 9/2018 Kitamura ............... H02K 21/22
2019/0334405 A1 * 10/2019 Yamasaki .............. H02K 15/12
2021/0140440 A1 * 5/2021 Fang ........................ H02K 5/08

FOREIGN PATENT DOCUMENTS

| | | | |
|---|---|---|---|
| CN | 105810115 | A | 7/2016 |
| DE | 102015216335 | A1 | 3/2017 |
| TW | 200835120 | A | 8/2008 |
| TW | 200928107 | A | 7/2009 |
| TW | I323071 | B | 4/2010 |

* cited by examiner

FAN

CROSS-REFERENCE TO RELATED APPLICATION

This application claims the benefit of U.S. Provisional Application Ser. No. 62/932,636 filed on Nov. 8, 2019, and entitled "FAN AND FAN FRAME THEREOF", the entirety of which is hereby incorporated by reference.

FIELD OF THE INVENTION

The present disclosure relates to a fan, and more particularly to a fan with wall thickness arrangement to prevent falling of the electronic components.

BACKGROUND OF THE INVENTION

With rapid development of high-tech industries, various electronic devices become essential in our lives. As known, the heat-dissipating efficacy of the electronic device influences the operating stability and the lifespan of the overall system. For increasing the heat-dissipating efficacy and the operating stability of the electronic device, a fan is usually installed within the electronic device or installed in the ambient environment to cool the electronic device.

FIG. 1 is a schematic cross-sectional view illustrating a conventional fan. As shown in FIG. 1, the fan 1 comprises an impeller 10, a rotor 11, a stator 12, a bearing unit 13, a fan frame 14 and a circuit board 16. The impeller 10 is mounted on the rotor 11. The rotor 11, the stator 12 and the bearing unit 13 collaboratively form a motor. The stator 12 is disposed around the bearing unit 13, and the impeller 10 and rotor 11 are driven to rotate by the stator 12. The fan frame 14 has a motor base 15 disposed in a center portion thereof. The bearing unit 13 is disposed on the motor base 15. The circuit board 16 is disposed between the stator 12 and the motor base 15, and a plurality of electronic components 160 are disposed on a surface 161 of the circuit board 16.

When the fan 1 is assembled, a filler 17 is filled into the space between the circuit board 16 and motor base 15 so as to protect the stator 12 and the circuit board 16 from external liquid and dust. As shown in FIG. 1, when the filler 17 is filled into the inner space of the fan 1, the filler 17 covers the plurality of electronic components 160 and the surface 161 of the circuit board 16. However, the inner surface 151 of the motor base 15 of the fan frame 14 is flat, and the thickness hl of the filler 17 between the surface 161 of the circuit board 16 and the inner surface 151 of the motor base 15 is usually constant and thick. Since the sizes and heights of the electronic components 160 are different with each other, the thicknesses of the filler 17 formed between the electronic components 160 disposed on the surface 161 of the circuit board 16 and the inner surface 151 of the motor base 15 are different and un-uniform. In other words, the thicknesses of the filler 17 covering on the electronic components 160 are different, some may be thick, and others may be thin. As the fan is subjected to changes of environmental temperature, the filler 17 undergoes thermal expansion and contraction. The thicknesses of the filler 17 may influence the degree of thermal expansion and contraction. Under this circumstance, different inner stresses may be generated to exert on the corresponding electronic components 160 due to thermal expansion and contraction of the filler 17. After long-term use of the fan 1, the electronic components 160 may be loosened and detached from the circuit board 16, which may result in malfunction of the fan 1.

Therefore, there is a need of providing a fan to address the drawbacks encountered from the prior arts.

SUMMARY OF THE INVENTION

It is an object of the present disclosure to provide a fan. The fan comprises a fan frame, and a wall thickness arrangement is applied on a motor base of the fan frame. A plurality of concave parts are concavely formed on a second surface of the motor base and are corresponding in positions and heights to the corresponding electronic components on a circuit board. A filling material is filled into the concave parts to form an enclosing layer, so as to enclose the electronic components with the uniform enclosing layer having a specific thickness. Consequently, the inner stress resulting from the uneven thickness of prior art is obviated, and the problems of easily falling of the electronic components or malfunction of the fan are also avoided.

It is another object of the present disclosure to provide a fan. The fan comprises a wall thickness arrangement created in advance during an injection molding process of a motor, and an enclosing layer is directly formed on the circuit board. The enclosing layer has a third surface, and the third surface has protrusion parts or concave parts corresponding in positions and heights to the corresponding electronic components. Consequently, the electronic components are enclosed by the uniform enclosing layer having a specific thickness. Therefore, the inner stress resulting from the uneven thickness of prior art is obviated, and the problems of easily falling of the electronic components or malfunction of the fan are also avoided.

In accordance with an aspect of the present disclosure, there is provided a fan. The fan comprises a fan frame, a motor, an impeller, a circuit board and an enclosing layer. The fan frame has a motor base disposed in a central portion thereof. The motor is mounted on the motor base and has a rotor, a stator and a bearing unit. The stator is disposed around the outer periphery of the bearing unit, and the rotor is sheathed on the stator and the bearing unit. The impeller is mounted on the motor. The circuit board is sheathed on the bearing unit and located between the stator and the motor base, and has a plurality of electronic components disposed on a first surface thereof. The stator and the circuit board are enclosed by the enclosing layer, and the plurality of electronic components are enclosed by the uniform enclosing layer with a specific thickness.

In an embodiment, the specific thickness is ranged between 0.8 mm and 2.0 mm.

In an embodiment, the motor base of the fan further comprises a second surface, and a wall thickness arrangement is created on the second surface according to the corresponding electronic components.

In an embodiment, the wall thickness arrangement has a plurality of concave parts formed on the second surface, wherein the positions and the depths of the concave parts are corresponding to the positions and heights of the corresponding electronic components.

In an embodiment, the specific thickness of the enclosing layer is defined by a distance between a top surface of the electronic component and the second surface of the concave part.

In an embodiment, a width of each of the concave parts is greater than a width of each of the electronic components.

In an embodiment, a plurality of lateral spaces are formed in two sides of the electronic components, respectively, and configured to allow a filling material to flow into the corresponding concave part.

In an embodiment, a width of each of the lateral spaces is ranged between 1.0 mm and 1.5 mm.

In an embodiment, the motor is formed by an injection molding process, and the wall thickness arrangement is created in advance during the injection molding process of the motor.

In an embodiment, the wall thickness arrangement allows the enclosing layer to be directly formed on and enclose the circuit board, and the enclosing layer has a third surface, wherein the third surface has a plurality of concave parts and a plurality of protrusion parts, and the plurality of concave parts and the plurality of protrusion parts are corresponding in positions and heights to the corresponding electronic components, so that the plurality of electronic components are enclosed by the uniform enclosing layer with the specific thickness.

In an embodiment, the rotor of the motor further has a top surface, and the top surface has a plurality of through holes for allowing air to pass therethrough.

In accordance with another aspect of the present disclosure, there is provided a fan. The fan comprises a fan frame, a motor, an impeller, a circuit board and an enclosing layer. The fan frame has a motor base disposed in a central portion thereof. The motor is mounted on the motor base and has a rotor, a stator and a bearing unit, wherein the stator is disposed around the outer periphery of the bearing unit, and the rotor is sheathed on the stator and the bearing unit. The impeller is mounted on the motor. The circuit board is sheathed on the bearing unit and located between the stator and the motor base, and has a plurality of electronic components disposed on a first surface thereof. The motor base has a second surface, and a plurality of concave parts is concavely formed on the second surface. The positions and the depths of the concave parts are corresponding to the positions and heights of the corresponding electronic components.

In an embodiment, one of the plurality of concave parts is corresponding to the plurality of electronic components with same heights.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
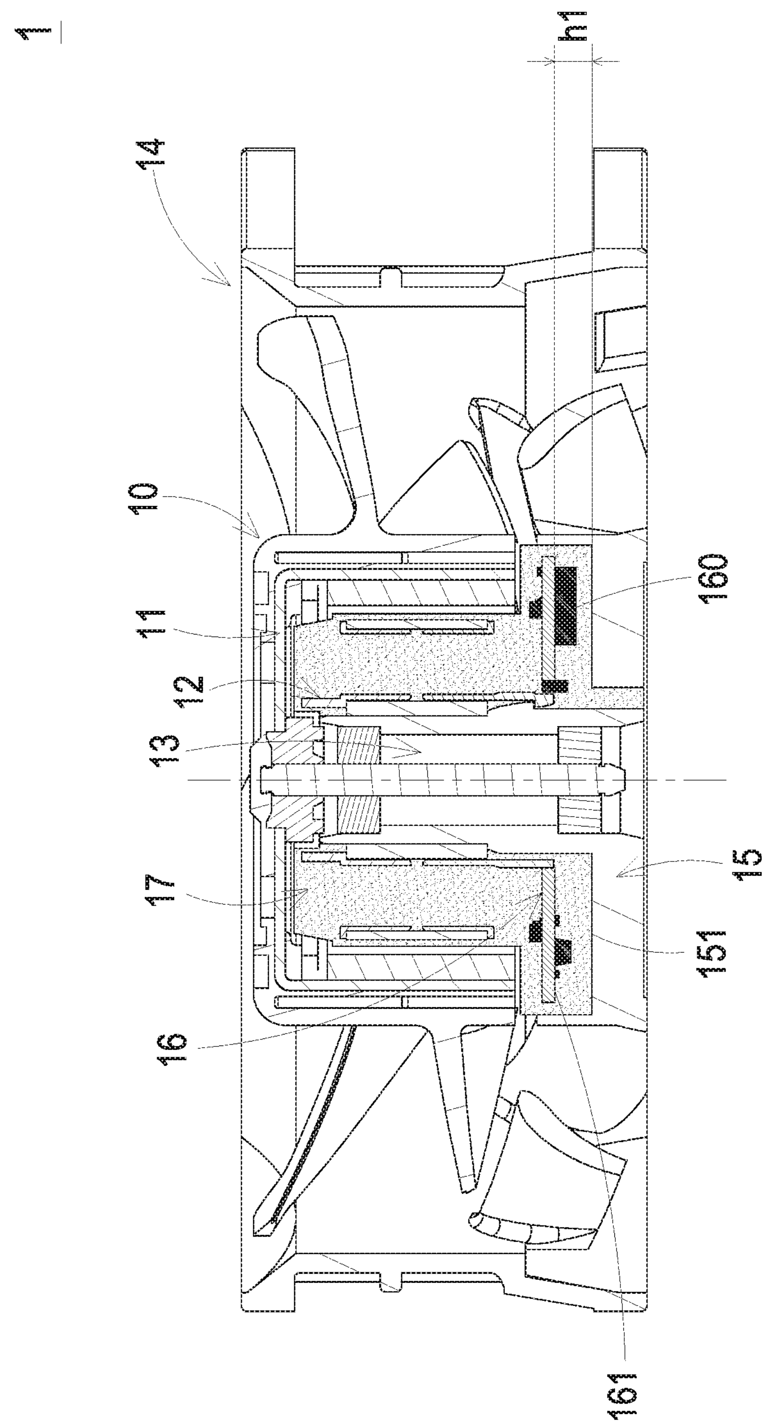
FIG. 1 is a schematic cross-sectional view illustrating a conventional fan.
Figure 2:
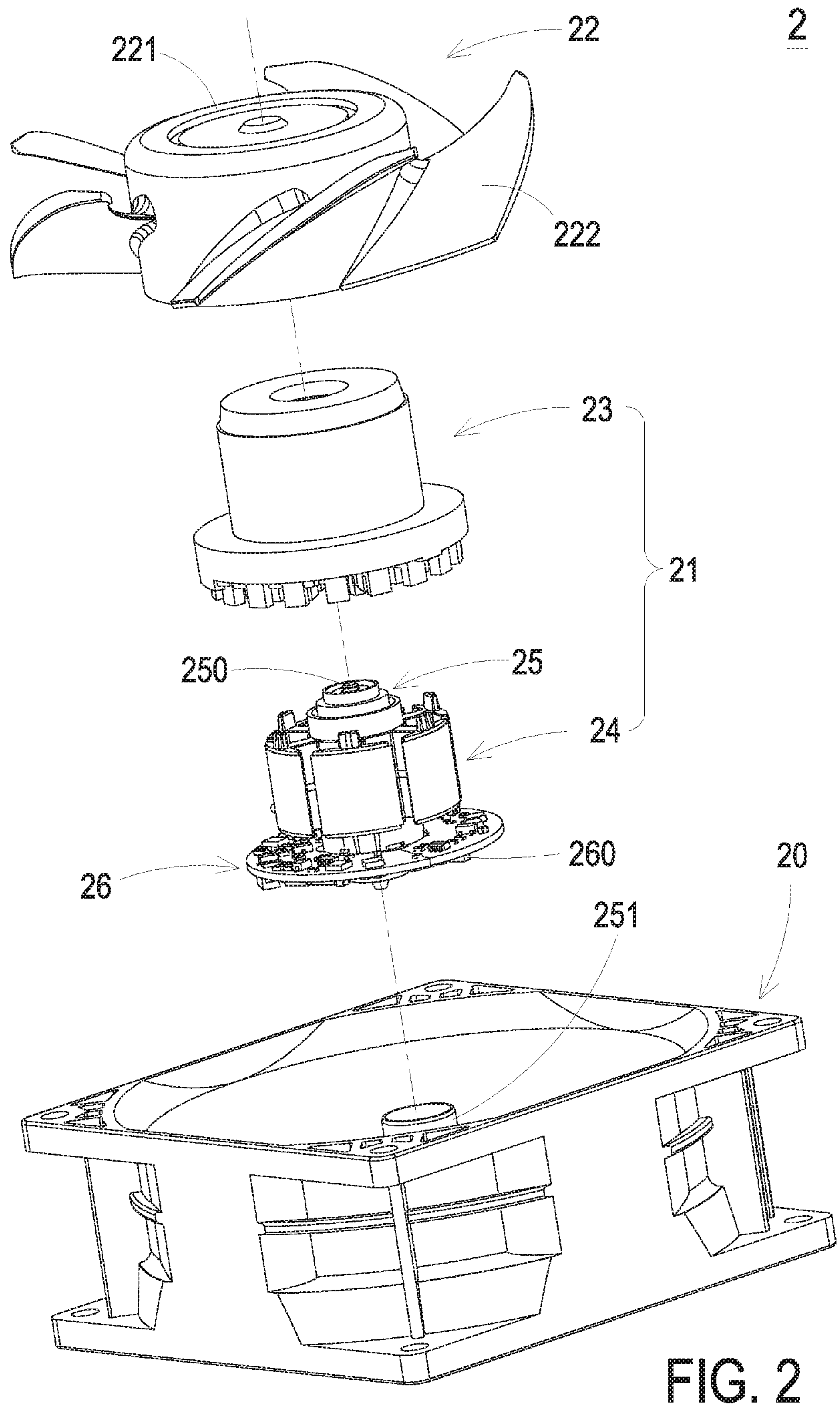
FIG. 2 is a schematic exploded view illustrating a fan according to a first embodiment of the present disclosure.
Figure 3:
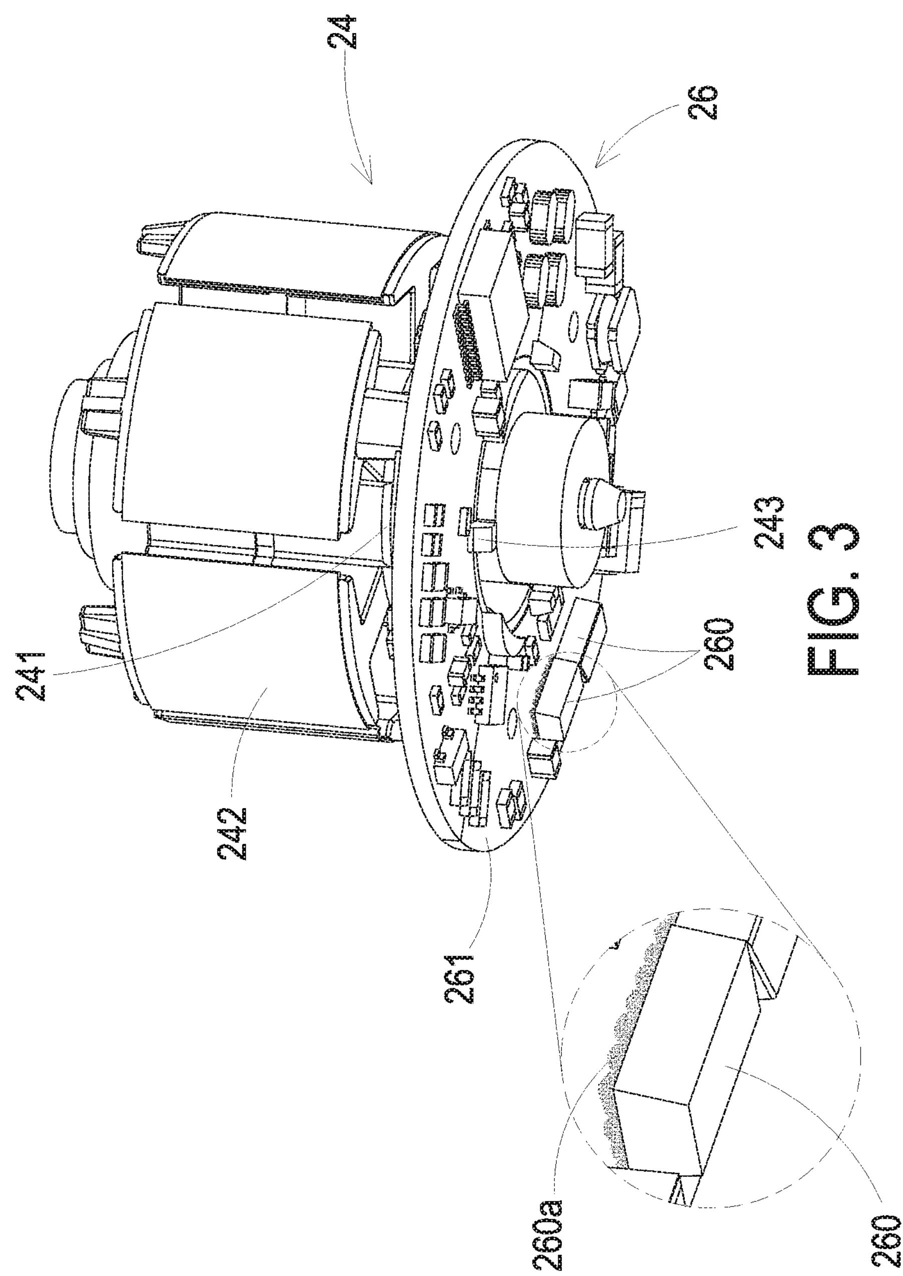
FIG. 3 is a schematic rear view illustrating a stator and a circuit board of the fan of FIG. 2.
Figure 4:
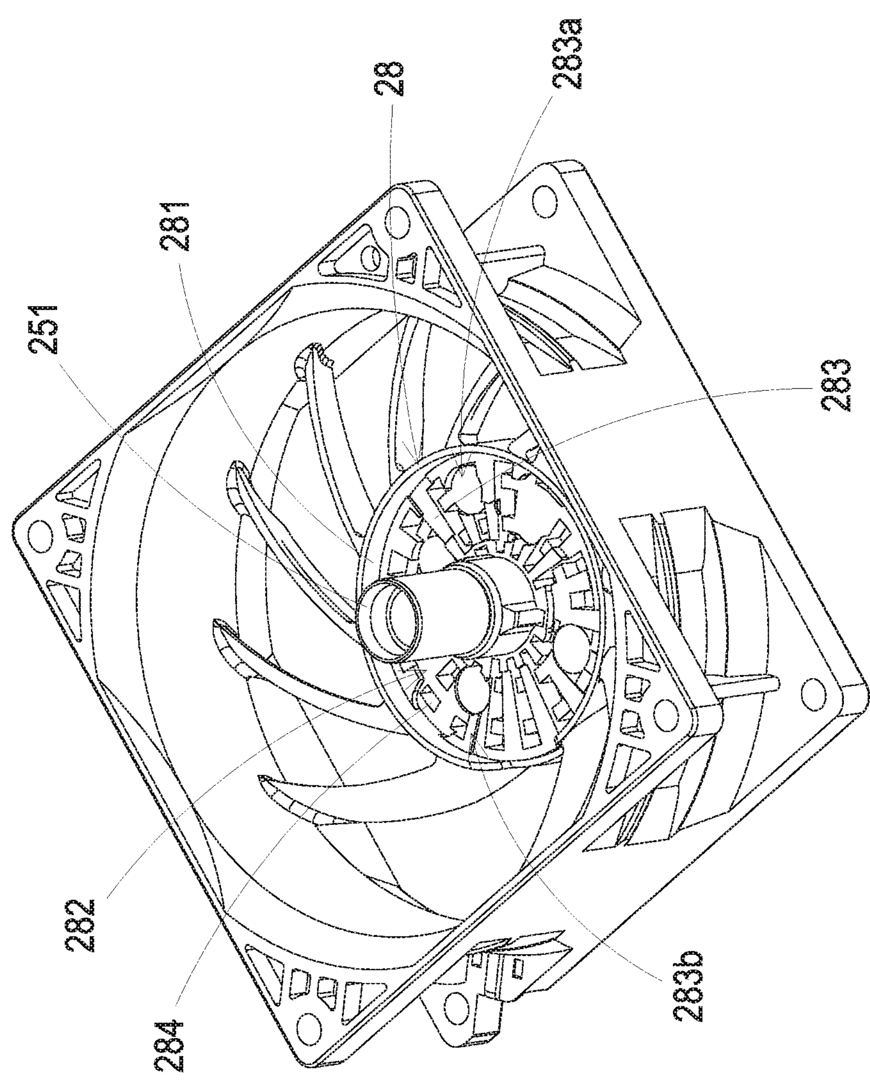
FIG. 4 is a schematic perspective view illustrating a fan frame of the fan of FIG. 2.
Figure 5:
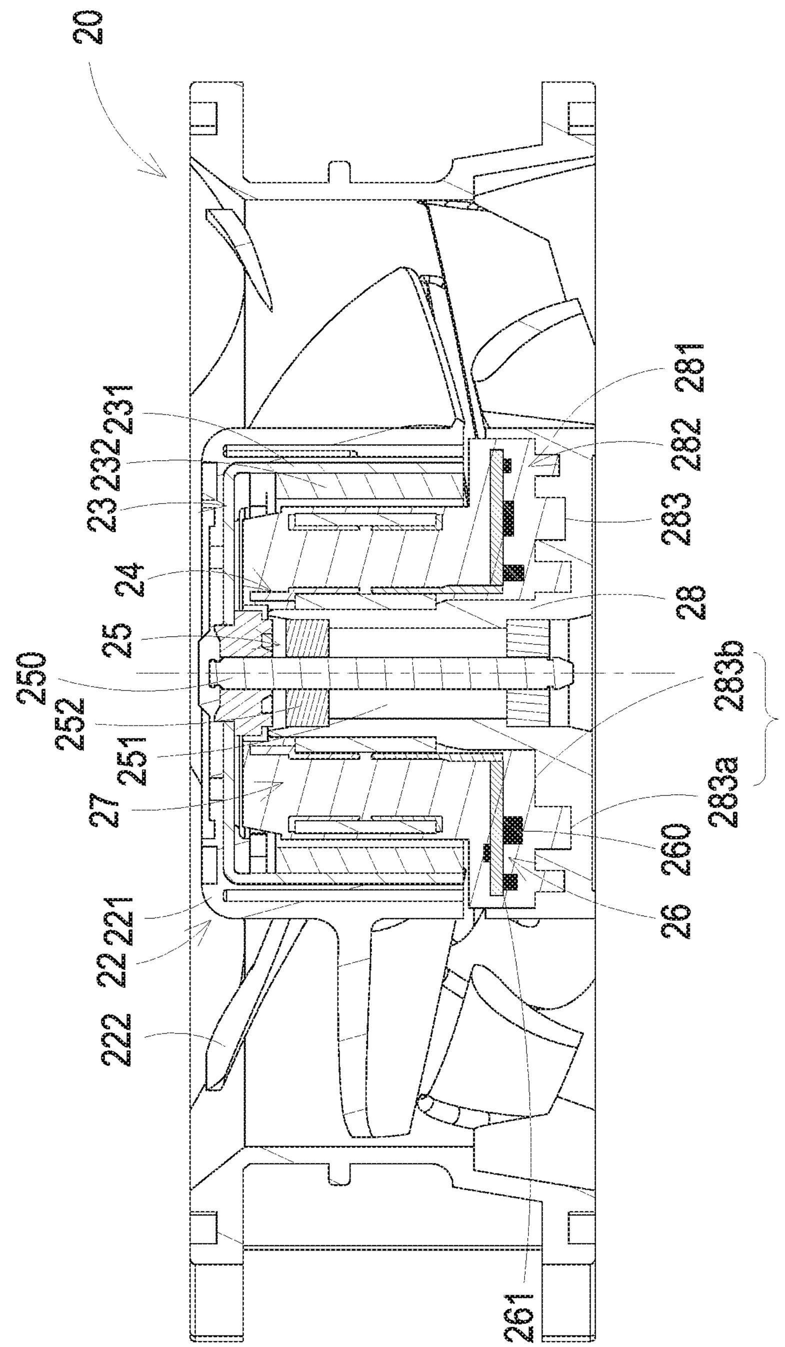
FIG. 5 is a schematic cross-sectional view illustrating the fan of FIG. 2.
Figure 6:
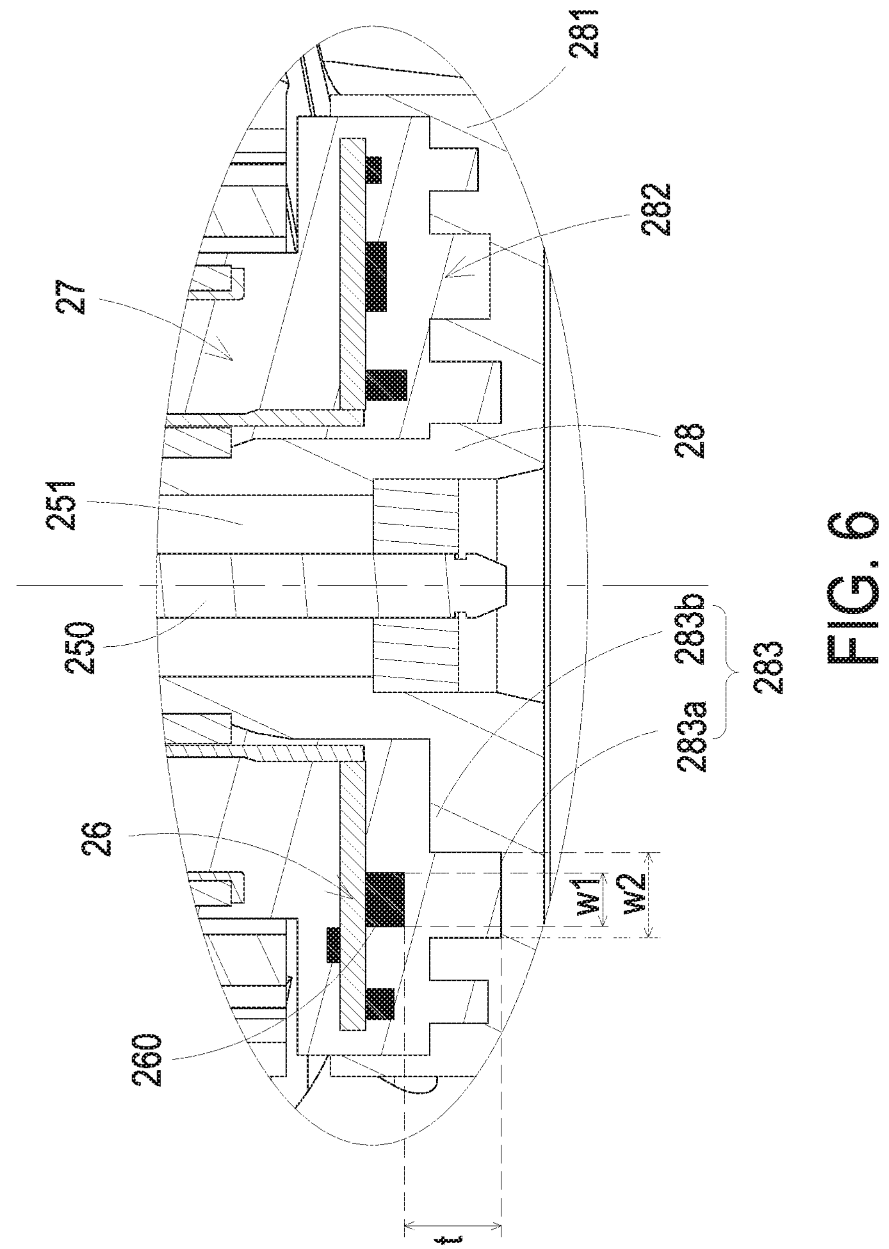
FIG. 6 is a partial enlargement schematic view of the fan of FIG. 5.

FIG. 2 is a schematic exploded view illustrating a fan according to a first embodiment of the present disclosure. FIG. 3 is a schematic rear view illustrating a stator and a circuit board of the fan of FIG. 2. FIG. 4 is a schematic perspective view illustrating a fan frame of the fan of FIG. 2. FIG. 5 is a schematic cross-sectional view illustrating the fan of FIG. 2. FIG. 6 is a partial enlargement schematic view of the fan of FIG. 5. As shown in FIGS. 2 to 6, the fan 2 comprises a fan frame 20, a motor 21, an impeller 22, a rotor 23, a stator 24, a bearing unit 25, a circuit board 26 and an enclosing layer 27 (as shown in FIG. 5). The fan frame 20 has a motor base 28 disposed in a center portion thereof. The rotor 23, the stator 24 and the bearing unit 25 collaboratively form the motor 21, and the motor 21 is mounted on the motor base 28. The stator 24 is disposed around the outer periphery of the bearing unit 25, and the rotor 23 is sheathed on the stator and the bearing unit 25. The bearing unit 25 has a rotating shaft 250. The rotating shaft 250 is connected with the center portion of the impeller 22, so that the impeller 22 is mounted on the motor 21 through the connection of the rotating shaft 250. Consequently, the impeller 22 and rotor 23 are driven to rotate by the motor 21. The circuit board 26 is sheathed on the bearing unit 25 and located between the stator 24 and the motor base 28. The circuit board 26 has a first surface 261 and has a plurality of electronic components 260 disposed on the first surface 261, wherein the first surface 261 faces the motor base 28. As shown in FIGS. 5 and 6, the fan 2 further has an enclosing layer 27 configured to enclose the stator 24 and the circuit board 26, and the plurality of electronic components 260 on the first surface 261 of the circuit board 26 are enclosed by the uniform enclosing layer 27 with a specific thickness t.

Please refer to FIGS. 2, 3 and 5. As shown in FIG. 2, in this embodiment, the impeller 22 has a hub 221 and a plurality of blades 222. The blades 222 are disposed around the outer periphery of the hub 221. Preferably but not exclusively, the blades 222 and the hub 221 are integrally formed in one piece by a plastic injection molding process. As shown in FIGS. 2 and 5, the rotor 23 has a metallic case 231 and a plurality of magnets 232. The magnets 232 are mounted on an inner surface of the sidewall of the metallic case 231 and face the stator 24. As shown in FIG. 3, the stator 24 has a stator seat 241 and at least one coils 242. The stator seat 241 has at least one engaging element 243. Moreover, the circuit board 26 has the first surface 261 and the plurality of electronic components 260. The plurality of electronic components 260 are disposed on the first surface 261. In an embodiment, the circuit board 26 is a ring-shape plate having a through hole and is sheathed on the lower portion of the stator seat 241 of the stator 24. The circuit board 26 is fixed to the stator seat 241 by the engaging element 243.

In some embodiments, a pre-processing procedure is performed on the circuit board 26 to enhance the adhesion between the plurality of electronic components 260 and the circuit board 26. The pre-processing procedure includes but not limited to a moisture-proof glue dipping procedure, a Nano-plating procedure or an underfill filling procedure. The moisture-proof glue dipping procedure is performed to dip the circuit board 26 by a moisture-proof glue, so that the circuit board 26 is moisture proofed. The Nano-plating procedure is performed to plate a Nano layer on the circuit board 26, so as to form a thin protecting layer on the circuit board 26. As shown in FIG. 3, in the embodiment, the underfill filling procedure is performed by applying the underfill 260*a* on the first surface 261 of the circuit board 26 and the bottom of the electronic components 260, so as to enhance the adhesion between the electronic components 260 and the circuit board 26. Preferably but not exclusively, the underfill 260*a* is made of Epoxy. It is noted that the pre-processing procedure is not limited to the above embodiments, and can be adjusted according to the practical requirements.

Please refer to FIGS. 2, 4 and 5 again. As shown in FIG. 4, the fan frame 20 is a frame structure and has a motor base 28. The motor base 28 is disposed in a center portion of the fan frame 20 and is configured to mount the motor 21 thereon. The motor base 28 has a ring-shaped wall 281, an accommodation space 282 and a second surface 283, wherein the second surface 283 faces the circuit board 26. The accommodation space 282 is defined by the ring-shaped wall 281, and the second surface 283 is the bottom surface of the accommodation space 282. In the embodiment, the motor base 28 has a plurality of concave parts 283*a* and a plurality of protrusion parts 283*b* formed on the second surface 283. Since the heights of the plurality of concave parts 283*a* and the plurality of protrusion parts 283*b* formed on the second surface 283 are uneven, the second surface 283 of the motor base 28 is a step surface, but not limited thereto. In some embodiments, the plurality of concave parts 283*a* and the plurality of protrusion parts 283*b* are disposed in an interlaced arrangement. Namely, the concave parts 283*a* are disposed among the protrusion parts 283*b*. It is noted that the fan frame 20 is formed by the injection molding process, wherein the positions of the concave parts 283*a* and the protrusion parts 283*b* and the heights of the concave parts 283*a* and the protrusion parts 283*b* are designed in advance by the wall thickness arrangement. More specifically, the wall thickness arrangement of the motor base 28 is created according to the positions and heights of the corresponding electronic components 260 on the first surface 216 of the circuit board 26. Preferably but not exclusively, the motor base 28 has a plurality of openings 284, which run through the motor base 28 and are in fluid communication with the accommodation space 282 of the motor base 28. It is noted that the number and the positions of the openings 284 are not limited to the above embodiments, and can be adjusted according to the practical requirements.

Please refer to FIGS. 2 and 5. In the embodiment, the bearing unit 25 has a bearing stand 251, a bearing 252 and a rotating shaft 250. The rotating shaft 250 is connected with a center portion of the impeller 22. The bearing stand 251 is connected with the motor base 28 and located at a center portion of the motor base 28. The bearing 252 is accommodated within the bearing stand 251. The rotating shaft 250 is penetrated through the bearing stand 251. The stator 24 is disposed around the outer periphery of the bearing stand 251 and fixed to the bearing stand 251. The fan frame 20 is disposed at the outer portion of the fan 2 and surrounds the impeller 22, the rotor 23, the stator 24 and the bearing unit 25. The circuit board 26 is fastened to the bottom of the stator 24 and located between the stator 24 and the motor base 28. As shown in FIG. 5, after the impeller 22, the rotor 21, the stator 22, the bearing unit 23 and the fan frame 24 are assembled, the circuit board 26 is disposed in the accommodation space 282 of the motor base 28, and the first surface 261 of the circuit board 26 faces the second surface 283 of the motor base 28. In an embodiment, a filling material is filled into the fan 2 through the opening 284 of the motor base 28, i.e., the filling material is filled into the accommodation space 282 through the openings 284 of the motor base 28, so that the stator 24 and the circuit board 26 disposed within the accommodation space 282 are enclosed by the filling material. After a curing process is performed, an enclosing layer 27 with a specific thickness t is formed, so as to protect the stator 24 and the circuit board 26 from external liquid and dust, and the purposes of water-proof and dust-proof are achieved.

In an embodiment, the filling material of the enclosing layer 27 is water-proof material. Preferably but not exclusively, the filling material of the enclosing layer 27 is made of Epoxy, Silicone or Polyurethane. In some embodiments, the enclosing layer 27 is cured by rapid cooling at low temperature or heating at high temperature, and the curing method can be adjusted according to the practical requirements.

Please refer to FIGS. 5 and 6. In the embodiment, the motor base 28 has a plurality of concave parts 283*a* and a plurality of protrusion parts 283*b* formed on the second surface 283 thereof, wherein the second surface 283 faces the circuit board 26. Namely, the second surface 283 of the motor base 28 is an uneven and step surface. In addition, as previously mentioned, the wall thickness arrangement on the second surface 283 of the motor base 28 are created according to the positions and heights of the corresponding electronic components 260 on the first surface 261 of the circuit board 26. As shown in FIG. 6, the plurality of concave parts 283*a* disposed on the second surface 283 of the motor base 28 are corresponding in positions to the plurality of electronic components 260 on the first surface 261 of the circuit board 26. More specifically, the positions and depths of the plurality of concave parts 283*a* are corresponding to the positions and heights of the plurality of electronic components 260. Consequently, the specific thickness t is maintained between the top surface of the electronic component 26 and the second surface 283 of the concave part 283*a*. In this embodiment, the width w2 of the concave part 283*a* is greater than the width w1 of the electronic component 26, so that a plurality of lateral spaces are formed in the two sides of the electronic component 26 respectively for accommodating overflow, and the lateral spaces are configured to allow the filling material to flow into the concave part 283*a* easily. In some embodiments, the width of the lateral space for accommodating overflow is ranged between 1.0 mm and 1.5 mm, but not limited thereto. In other embodiments, one of the plurality of concave parts 283*a* is corresponding in position to the plurality of electronic components 26 with same heights. It is noted that the number and positions of the plurality of concave parts 283*a* and the plurality of electronic components 26 are not limited to the above embodiments, and can be adjusted according to the practical requirements.

In particular, as shown in FIG. 6, the specific thickness t is maintained between the top surface of the electronic component 26 and the second surface 283 of the concave part 283*a* according to the wall thickness arrangement of the motor base 28. In other words, the specific thickness t is defined by a distance between the top surface of the electronic component 26 and the second surface 283 of the concave part 283*a*. More specifically, the arrangement of the concave parts 283*a* and the protrusion parts 283*b* on the second surface 283 of the motor base 28 is used for maintaining the distance between the electronic components 260 and the second surface 283 of the motor base 28 to be located within the specific thickness t. Consequently, when the filling material flows into the concave parts 283*a* through the lateral spaces of the plurality of electronic components 260, the concave parts 283*a* are filled up by the filling material. After the curing process is performed, the enclosing layer 27 with an even specific thickness t is formed on and encloses each of the plurality of electronic components 260, so as to prevent the electronic components 260 from loosing or falling from the circuit board 26. In some embodiments, the specific thickness t is ranged between 0.8 mm and 2 mm, but not limited thereto. Consequently, the efficacy of protecting the circuit board 26, water-proof and dust-proof can be achieved by the enclosing layer 27. In this embodiment, the specific thickness t of the enclosing layer 27 covering on the plurality of electronic components 260 is maintained evenly according to the wall thickness arrangement on the second surface 283 of the motor base 28. Since the specific thickness t is thinner than that of the prior art, so that the inner stress resulting from the uneven thickness of prior art is obviated, and the problems of easily falling of the electronic components 260 or malfunction of the fan 2 are also avoided.

Figure 7:
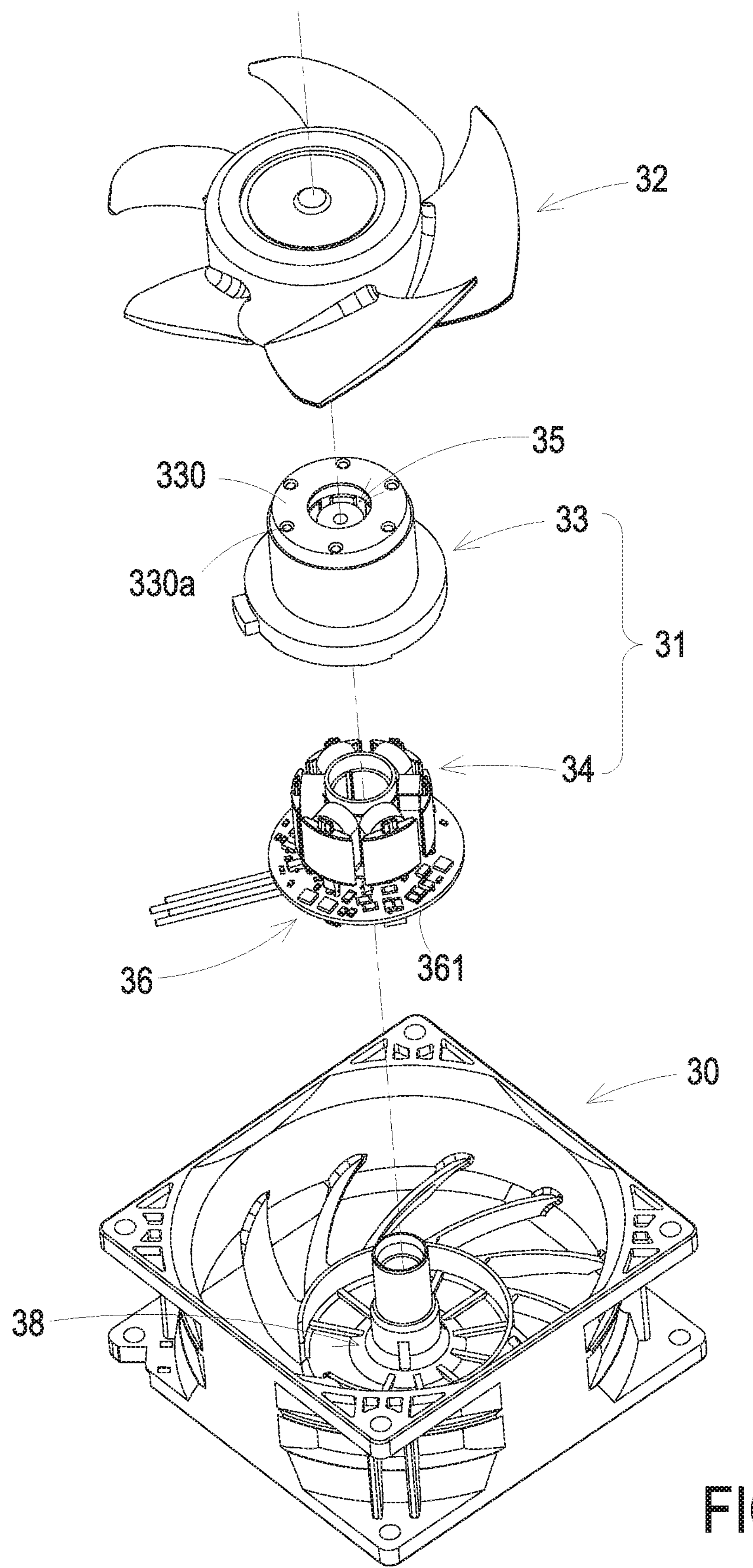
FIG. 7 is a schematic exploded view illustrating a fan according to a second embodiment of the present disclosure.
Figure 8:
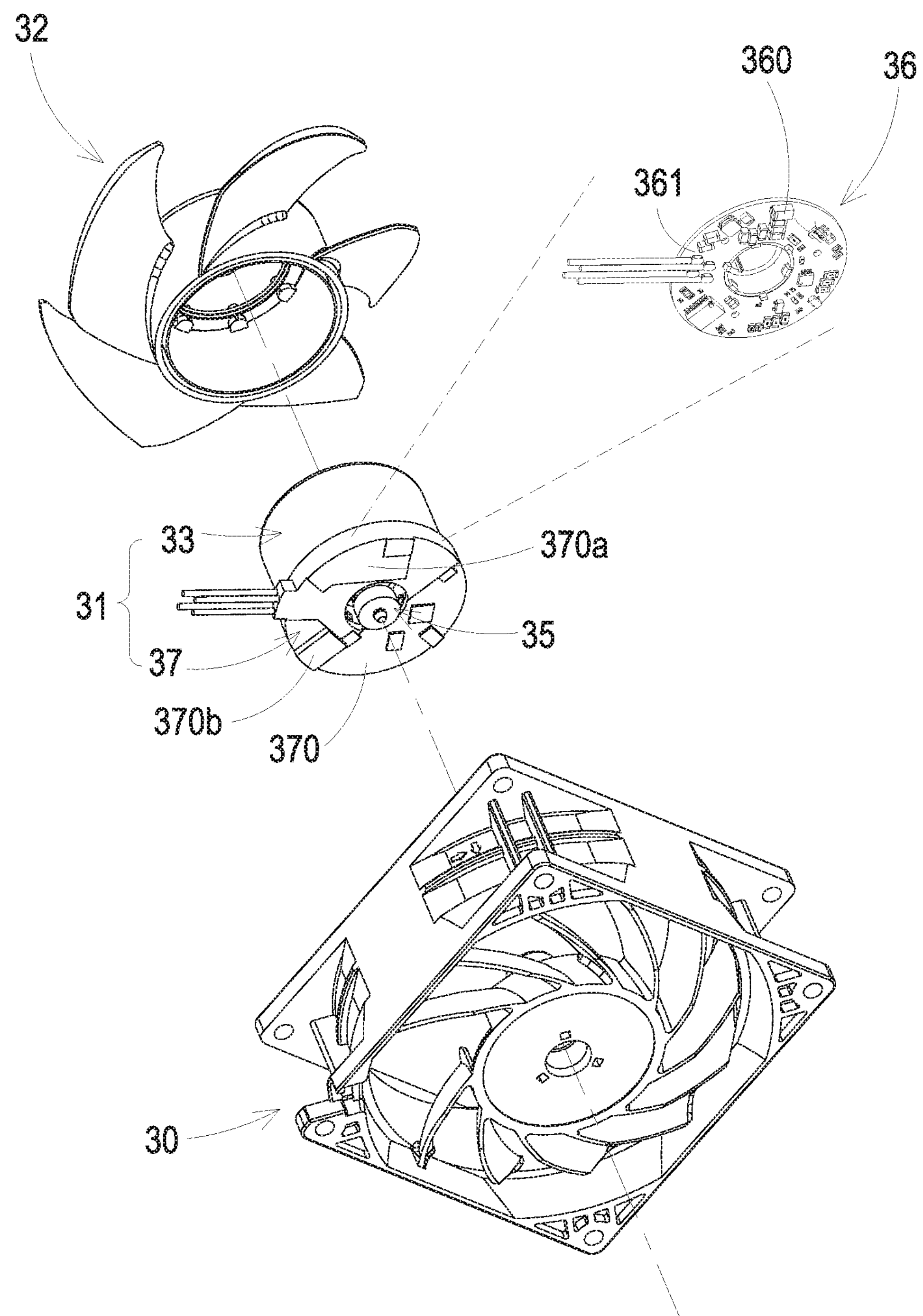
FIG. 8 is another schematic exploded view illustrating the fan of FIG. 7.

Please refer to FIGS. 7 and 8. FIG. 7 is a schematic exploded view illustrating a fan according to a second embodiment of the present disclosure. FIG. 8 is another schematic exploded view illustrating the fan of FIG. 7. As shown in FIG. 7, in the embodiment, the fan 3 comprises a fan frame 30, an impeller 32, a rotor 33, a stator 34, a bearing unit 35, a circuit board 36 and an enclosing layer 37 (as shown in FIG. 8). The rotor 33, the stator 34 and the bearing unit 35 collaboratively form the motor 31, and the circuit board 36 has a plurality of electronic components 360 disposed on a first surface 361 thereof. In this embodiment, the structures and functions of the impeller 32, the stator 34, the bearing unit 35 and the circuit board 36 are the same as those of the previous embodiment and are not redundantly described hereinafter. Comparing with the first embodiment, the wall thickness arrangement of the motor base 38 according to the plurality of electronic components 360 disposed on the first surface 361 of the circuit board 36 is different. More specifically, the wall thickness arrangement of this embodiment is not applied on the motor base 38 of the fan frame 30. Instead, the wall thickness arrangement of this embodiment is to form an enclosing layer 37 on the motor 31 by an injection molding process after the motor 31 is assembled. Consequently, the enclosing layer 37 is directly formed on the motor 31, so as to cover the stator 34 and the circuit board 36. Namely, the wall thickness arrangement of this embodiment is created in advance during the injection molding process of the motor 31.

In this embodiment, a plurality of through holes 330*a* are formed on the top surface 330 of the rotor 33, and configured to allow air to pass therethrough. Consequently, when a filling material is filled into the motor 31, the air can pass through the through holes 330*a*, so as to release the upper pressure of the circuit board 36 and prevent from air entrapment.

Please refer to FIG. 8 again. In this embodiment, the manufacturing process of the fan 3 is to fill the filling material into the assembled motor 31, after the injection molding process, the motor 31 with the wall thickness arrangement is formed. As shown in FIG. 8, the plurality of electronic components 360 are disposed on the first surface 361 of the circuit board 36, and the plurality of electronic components 360 and the first surface 361 of the circuit board 36 are enclosed by the enclosing layer 37. Moreover, the enclosing layer 37 has a third surface 370 facing the motor base 38, and the third surface 370 is an uneven and step surface. A plurality of concave parts 370*a* and a plurality of protrusion parts 370*b* are formed on the third surface 370. The positions and heights of the plurality of concave parts 370*a* and the plurality of protrusion parts 370*b* are corresponding to the positions and heights of the corresponding electronic components 360. In other words, in this embodiment, the wall thickness arrangement for the plurality electronic components 360 is created in advance during the injection molding process of the motor 31, so that the enclosing layer 37 are formed with the uneven and step surface. More specifically, a specific thickness t of the enclosing layer 37 is maintained and the enclosing layer 37 uniformly covers on each of the plurality of electronic components 360. Same as the previous embodiment, the specific thickness t is ranged between 0.8 mm and 2 mm, but not limited thereto. In order to avoid the inner stress generated from the thermal expansion and contraction around the plurality of electronic components 360, the lateral spaces for accommodating overflow are also formed in the two sides of the electronic components 360 respectively. In some embodiments, the width of the lateral space is ranged between 1.0 mm and 1.5 mm, but not limited thereto.

In the embodiment, a pre-processing procedure is performed on the motor 31. The pre-processing procedure includes but not limited to a moisture-proof glue dipping procedure, a Nano-plating procedure or an underfill filling procedure. The underfill filling procedure is performed by applying the underfill on the bottom of the electronic components 360, so as to enhance the adhesion between the electronic components 360 and the circuit board 36. The pre-processing procedure is not limited to the above embodiments, and can be adjusted according to the practical requirements.

From the above descriptions, the present disclosure provides a fan. A wall thickness arrangement is created according to the positions and heights of the electronic components. In an embodiment, the wall thickness arrangement is applied on the motor base of the fan frame. A plurality of concave parts are formed on the second surface of the motor base and are corresponding in positions and heights to the electronic components. A filling material is filled into the concave parts to form an enclosing layer, and the electronic components are enclosed by the uniform enclosing layer having a specific thickness. In another embodiment, the wall thickness arrangement is created in advance during an injection molding process of a motor, so that the enclosing layer is directly formed on the circuit board. The enclosing layer has a third surface. The third surface is an uneven and step surface. A plurality of protrusion parts and concave parts are formed on the third surface and are corresponding in positions and heights to the corresponding electronic components. Consequently, the electronic components are enclosed by the uniform enclosing layer having the specific thickness. The enclosing layer is co-formed with the electronic components, and the outer contour of the enclosing layer may be corresponding to the electronic components, but not limited thereto. Consequently, the enclosing layer is maintained in an even specific thickness and thinner than the prior arts so as to obviate the inner stress resulting from the uneven thickness, and the problems of easily falling of the electronic components or malfunction of the fan are avoid. In addition, a pre-processing procedure can be performed on the circuit board or the motor, so that the adhesion between the electronic components and the circuit board is enhanced, and the structure strength is also enhanced. Consequently, the wall thickness arrangement of the fan achieves the purposes of water-proof and dust-proof, enhances the temperature tolerance of the fan, avoids the problems of easily falling of the electronic components or malfunction of the fan, and extends the lifespan of the fan.

While the disclosure has been described in terms of what is presently considered to be the most practical and preferred embodiments, it is to be understood that the disclosure needs not be limited to the disclosed embodiment.

What is claimed is:

1. A fan, comprising:

a fan frame having a motor base disposed in a central portion thereof;

a motor mounted on the motor base and having a rotor, a stator and a bearing unit, wherein the stator is disposed around an outer periphery of the bearing unit, and the rotor is sheathed on the stator and the bearing unit;

an impeller mounted on the motor;

a circuit board sheathed on the bearing unit and located between the stator and the motor base, and having a plurality of electronic components disposed on a first surface thereof facing the motor base;

wherein the motor base has a second surface facing the circuit board; and an enclosing layer formed from a filling material, wherein the filling material is fully filled into an inner space of the motor, wherein the stator and the circuit board are enclosed by the enclosing layer, a top surface of each of the plurality of electronic components facing the motor base and lateral surfaces of each of the plurality of electronic components are uniformly and fully covered and enclosed by the enclosing layer with a specific thickness, so that the enclosing layer is formed with an uneven step surface facing the motor base, and the uneven step surface corresponds to the plurality of electronic components, wherein the motor base has a plurality of concave parts, and positions and depths of each of the plurality of concave parts vary and correspond to positions and heights of each of the plurality of electronic components, such that the second surface is another uneven step surface corresponding to the uneven step surface of the enclosing layer; and the specific thickness of the enclosing layer is uniform between a bottom of the depth of each concave part and the top surface of each corresponding respective electronic component of the plurality of electronic components so as to obviate an inner stress of the enclosing layer resulting from the specific thickness being uneven.

2. The fan according to claim 1, wherein the specific thickness is ranged between 0.8 mm and 2.0 mm.

3. The fan according to claim 1, wherein the uneven step surface is created on the second surface according to the plurality of electronic components.

4. The fan according to claim 3, wherein the uneven step surface is formed in the motor base.

5. The fan according to claim 4, wherein the specific thickness of the enclosing layer is defined by a distance between a top surface of one of the plurality of electronic components and a surface of one of the plurality of concave parts.

6. The fan according to claim 4, wherein a width of each of the plurality of concave parts is greater than a width of each of the plurality of electronic components.

7. The fan according to claim 4, wherein a plurality of lateral spaces are formed in two sides of the plurality of electronic components, respectively, and are configured to allow the filling material to flow into the plurality of concave parts.

8. The fan according to claim 7, wherein a width of each of the plurality of lateral spaces is ranged between 1.0 mm and 1.5 mm.

9. The fan according to claim 1, wherein the motor is formed by an injection molding process, and the another uneven step surface is created in advance of the injection molding process of the motor.

10. The fan according to claim 9, wherein the another uneven step surface allows the enclosing layer to be directly formed on and enclose the circuit board, and wherein the uneven step surface of the enclosing layer has a plurality of concave parts and a plurality of protrusion parts, and the plurality of concave parts and the plurality of protrusion parts are corresponding in positions and heights to the plurality of electronic components.

11. The fan according to claim 10, wherein the rotor of the motor further has a top surface, and the top surface of the motor rotor has a plurality of through holes for allowing air to pass therethrough.

* * * * *